(No Model.)
J. C. WOODMAN.
CULINARY VESSEL.
No. 593,316. Patented Nov. 9, 1897.
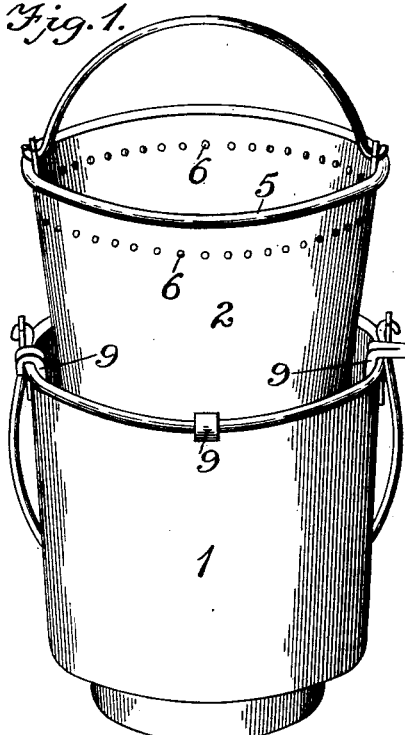
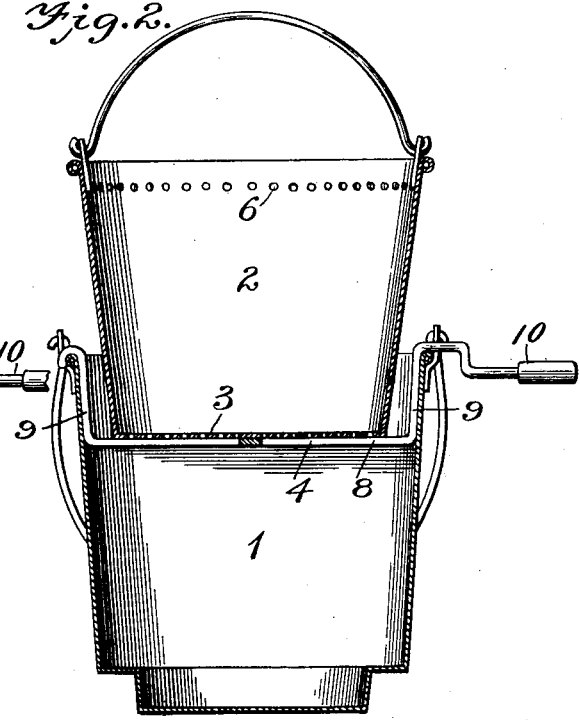
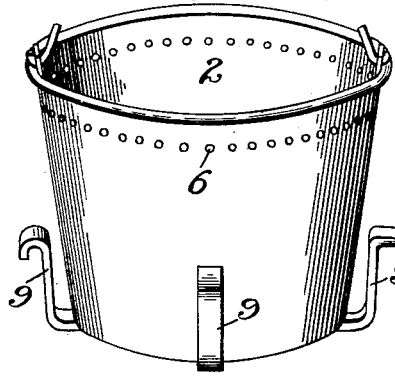
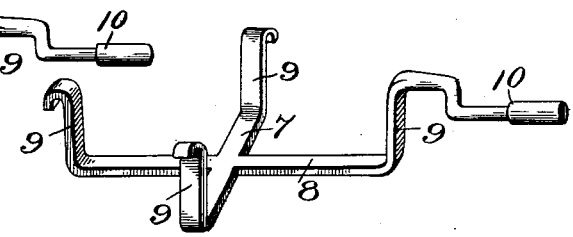
Witnesses
Edwin G. McKee
N. F. Riley
Inventor
John C. Woodman.
By his Attorneys,
C. A. Snow & Co.
THE NORRIS PETERS CO., PHOTO-LITHO., WASHINGTON, D. C.

UNITED STATES PATENT OFFICE.

JOHN C. WOODMAN, OF DIGBY, CANADA, ASSIGNOR OF ONE-HALF TO CLARENCE JAMISON, OF SAME PLACE.

CULINARY VESSEL.

SPECIFICATION forming part of Letters Patent No. 593,316, dated November 9, 1897.

Application filed April 22, 1897. Serial No. 633,396. (No model.)

*To all whom it may concern:*

Be it known that I, JOHN C. WOODMAN, a subject of the Queen of Great Britain, residing at Digby, in the Province of Nova Scotia and Dominion of Canada, have invented a new and useful Culinary Vessel, of which the following is a specification.

This invention relates to improvements in culinary vessels.

The object of the present invention is to improve the construction of culinary vessels and to provide a simple and inexpensive device adapted to be readily applied to ordinary pots and kettles and capable of supporting a drainer in an elevated position in a pot or kettle, so that the contents of the former may thoroughly drain.

A further object of the invention is to provide a device which will not only support a drainer within a pot or kettle, but which will serve as a rest to be placed upon a stove and receive a receptacle, so that the contents thereof may be kept warm and held out of actual contact with the stove.

The invention consists in the construction and novel combination and arrangement of parts, as hereinafter fully described, illustrated in the accompanying drawings, and pointed out in the claims hereto appended.

In the drawings, Figure 1 is a perspective view of a drainer supported in an elevated position in a pot or kettle. Fig. 2 is a vertical sectional view. Fig. 3 is a perspective view of the drainer and the supporting device. Fig. 4 is a detail perspective view of the supporting device.

Like numerals of reference designate corresponding parts in the several figures of the drawings.

1 designates a pot or kettle of the ordinary construction, adapted to be mounted on a stove in the usual manner and receiving a drainer 2, which is provided with a perforated bottom 3 and which is held in an elevated position in the pot or kettle 1 by a supporting device 4. The drainer 2, which receives the articles to be cooked, is provided at its upper edge with a bead or rim 5, which is adapted when the drainer is wholly within the pot or kettle to rest upon the upper edges thereof and support the bottom out of contact with the bottom of the pot or kettle in order to prevent the contents of the drainer from being burned should all of the water boil out of the kettle or pot. An annular series of perforations 6 is provided and arranged adjacent to the upper edge of the drainer to prevent the latter from boiling over when the liquid contents rise within the same, the perforations 6 permitting such contents to flow into the pot or kettle.

The support 4, which preferably consists of bars 7 and 8, is provided at the ends of the bars with upwardly-extending hook-shaped portions or arms 9, adapted to engage over the upper edges of the pot or kettle and suspend the body portions of the bars within the same. The body portions of the bars form a base and may be centrally secured together or otherwise connected, and the bar 8 is provided with an extension forming a handle 10. The handle 10 has its shank portion angularly bent and offset from the upper face of the adjacent arm 9. The arms 9, which form the hooks or hangers, are also adapted to serve as legs when the device is inverted to form a rest, which is adapted to be placed upon a stove to receive a receptacle and hold the same out of actual contact with the stove, so that the contents of such receptacle will warm without burning. The supporting device may also be placed upon a stove in the position shown in Fig. 4 when it is desired to bring the receptacle closer to the fire.

When it is desired to drain the contents of the receptacle 2, it is lifted and the supporting device is introduced under it and arranged as illustrated in Figs. 1 and 2 of the accompanying drawings. In this position the contents of the receptacle will quickly and thoroughly drain.

It will be seen that the device is exceedingly simple and inexpensive in construction; that it is adapted to support the drainer in an elevated position within a pot or kettle, and that it is adapted also to serve as a rest and to be placed on a stove for keeping dishes warm without permitting them to come into actual contact with the stove.

What I claim is—

1. A device of the class described comprising a horizontal base adapted to receive and support a receptacle, and the substantially vertical hook-shaped portions extending from the base and adapted to engage over the upper edge of a pot or kettle and arranged to form supporting-legs when the device is inverted, substantially as described.

2. In a kettle-support, a base comprising a pair of bars arranged at right angles to each other, the terminals of said bars being bent at right angles thereto and formed with hooks at their ends adapted to engage the upper edge of a pot or kettle and arranged to support the device when inverted, substantially as described.

In testimony that I claim the foregoing as my own I have hereto affixed my signature in the presence of two witnesses.

JOHN C. WOODMAN.

Witnesses:
    DON KINNEY,
    C. JAMISON.